May 16, 1950

E. M. CALLENDER ET AL

WELD CONTROL CIRCUIT WITH INDUCTIVE VOLTAGE ELIMINATION 2,508,330

Filed March 20, 1948

3 Sheets-Sheet 1

FIRST CLIPPER

FIRST AMPLIFIER

INVENTORS
EDWIN M. CALLENDER
BY HERBERT D. VAN SCIVER II
Maurice A. Crews
ATTORNEY

SECOND CLIPPER AND AMPLIFIER

SQUARE WAVE PULSER

SIGNAL PULSER

INVENTORS
EDWIN M. CALLENDER
BY HERBERT D. VAN SCIVER II
Maurice A. Crews
ATTORNEY May 16, 1950 E. M. CALLENDER ET AL 2,508,330

WELD CONTROL CIRCUIT WITH INDUCTIVE VOLTAGE ELIMINATION

Filed March 20, 1948 3 Sheets-Sheet 3

DIVIDER

COMPARATOR

INVENTORS
EDWIN M. CALLENDER
HERBERT D. VAN SCIVER II
BY Maurice A. Crews
ATTORNEY Patented May 16, 1950 2,508,330

UNITED STATES PATENT OFFICE 2,508,330

WELD CONTROL CIRCUIT WITH INDUCTIVE VOLTAGE ELIMINATION

Edwin M. Callender, Cynwyd, and Herbert D. Van Sciver, II, Merion, Pa., assignors to The Budd Company, Philadelphia, Pa., a corporation of Pennsylvania Application March 20, 1948, Serial No. 16,004

18 Claims. (Cl. 219—4)

This invention relates to a control circuit for electric resistance welding apparatus with specific application to circuit means for elimination of current inductive effect in the control apparatus. More broadly considered, the invention pertains to improvement in a control system wherein power mechanism is operated by a change of voltage in a load circuit due to a change of resistance in the circuit and independently of the change of current in the load circuit.

In copending applications of Edwin M. Callender, Ser. No. 630,401 filed November 23, 1945, now Patent No. 2,472,043, dated May 31, 1949, and Serial No. 790,192 filed December 6, 1947, now Patent No. 2,486,552, dated November 1, 1949, circuit control systems are described which may be classified with this application. In these prior applications, however, while means for elimination of inductive effect, such as that of the welding tool, are indicated, the means described normally function only on a given status of conditions and surroundings, such as the proximity of magnetic circuits to that of the welding circuit, the length of path of the main conductors to the equipment from the power source and other sections of the circuit and in the particular nature of the work material upon which the welder operates. For conditions varying from the original set conditions, adjustment must be made in the inductive voltage neutralization means.

It is one of the primary objects of the present invention to provide an electric control system of the type mentioned, which is automatically adjustable to variable conditions of circuit and of installation. Another important object of the invention is the provision of circuit means and apparatus functioning to eliminate substantially time lag in the operation of the control as related to the initiating load circuit voltages. An object of the invention is to provide a control circuit which functions properly on relatively large fluctuations of load current. Objects also are to provide control means having stable characteristics and which are operable on a reduced supply of signal power. Still another object of the invention is to provide improved means for presenting percentage voltage values at which the control mechanism functions. A general object of the invention is to provide a control circuit adapted for welding equipment and other power mechanism which operates with a high degree of precision and definiteness on the development of an initiating signal in the primary load circuit.

For a disclosure of our invention, reference is made to the following description and to the accompanying drawings, in which.

Figure 3:
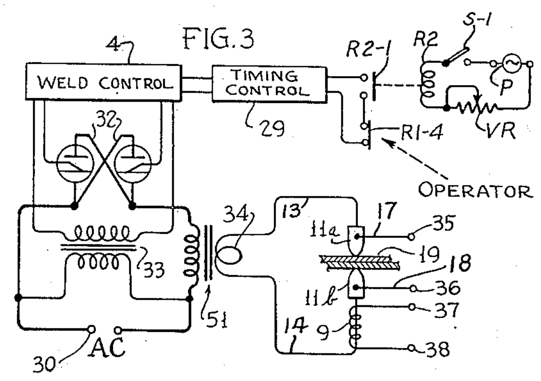
Figure 1:
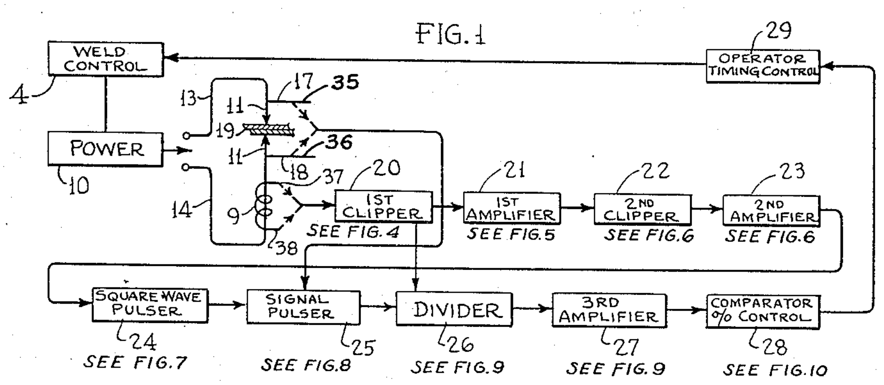
Figure 1 is a block diagram of the circuit as applied to welding equipment.
Figure 4:
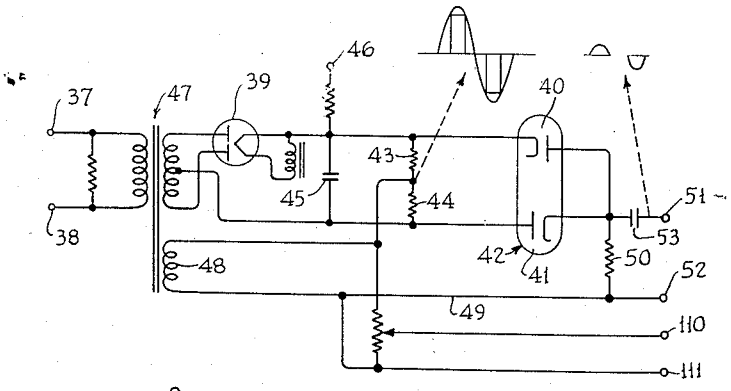
Figure 5:
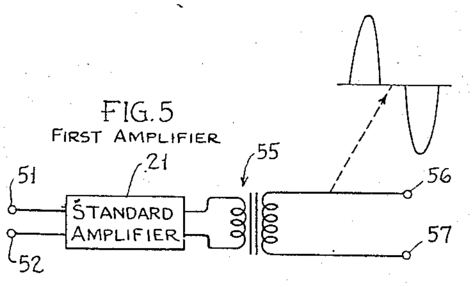
Figure 6:
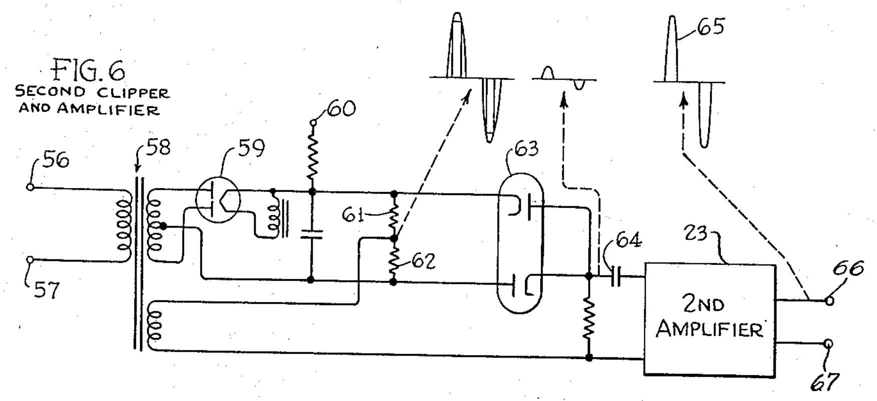
Figure 7:
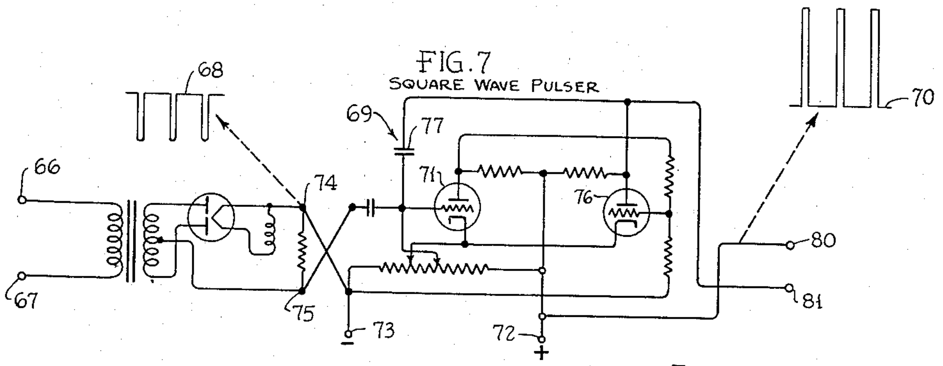
Figures 8, 12:
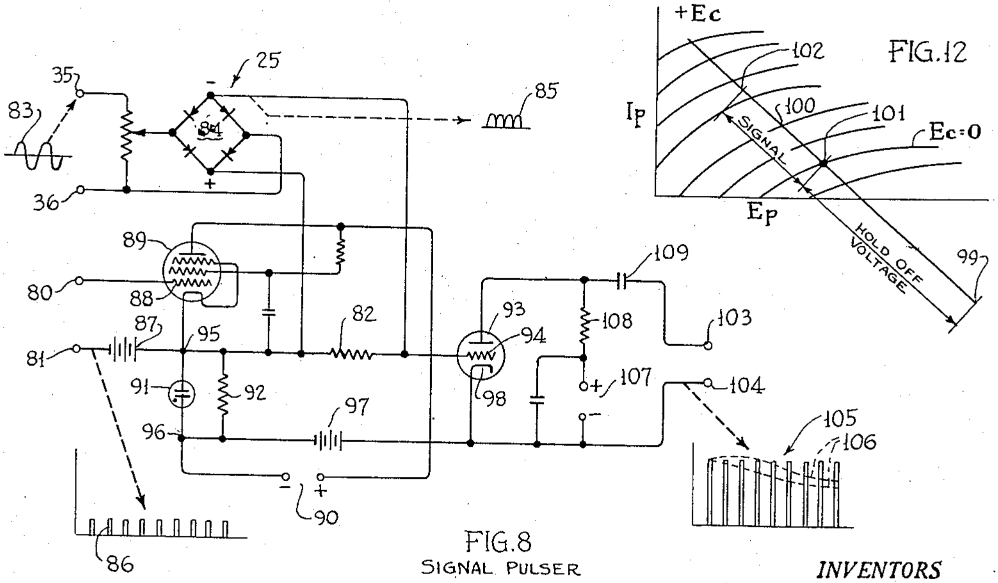
Figure 9:
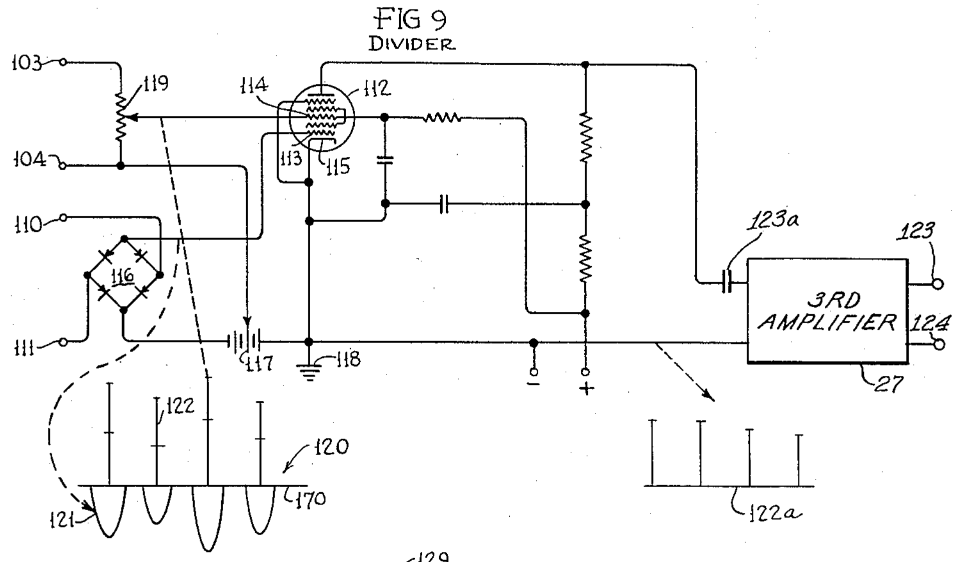
Figure 10:
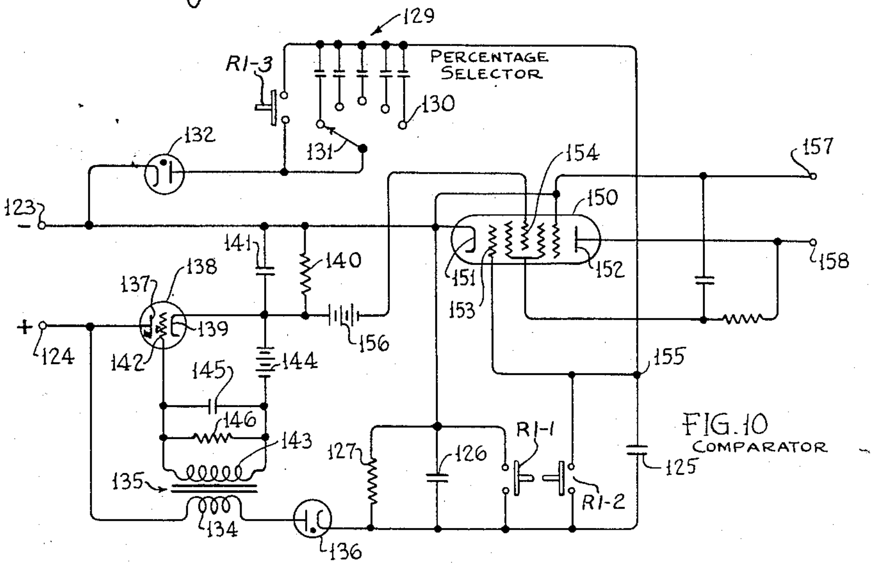
Figure 11:
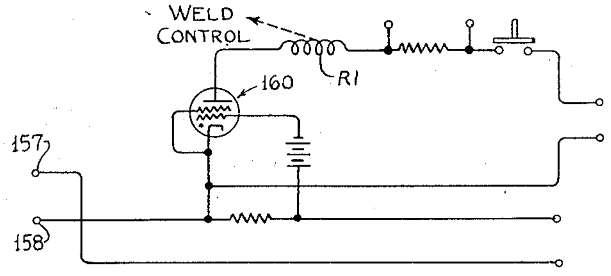

Figures 3 to 11 are schematic diagrams of the special circuits applicable to the blocks of Fig. 1, these diagrams being directed in Fig. 3 to the weld and power control, in Fig. 4 to the first clipper circuit, in Fig. 5 to the first amplifying circuit, in Fig. 6 to the second clipper and amplifier circuits, in Fig. 7 to the square wave pulser, in Fig. 8 to the signal pulser, in Fig. 9 to the voltage divider circuit, in Fig. 10 to the voltage comparing and percentage selecting circuit, and in Fig. 11 to the operating circuit; and Fig. 12 is a diagram of class B tube characteristics.

In order to secure a clear understanding of the invention, the description is limited primarily to use of the control circuit for resistance welding equipment. It will become apparent on an understanding of this application that the control circuit may be applied more broadly to any load circuit in which there is a voltage change due to a variation of a special circuit condition, as a change in load, and where it is desired to utilize this voltage change to operate power mechanism of any type whether it be cut-out switches for the initiating load circuit or mechanism in circuits entirely independent of the load circuit.

Figure 2:
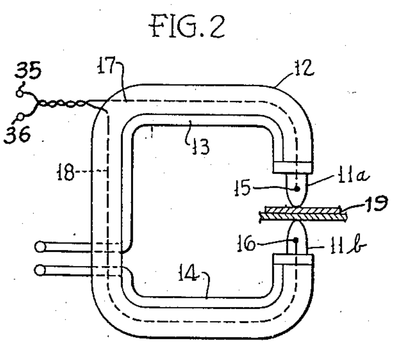
Figure 2 is a structural view in side elevation of a resistance welder yoke with attached electrodes and intervening workpiece.

Fig. 1 illustrates the general nature of the invention by means of blocks with flow indications. Power initiated at block 10, which may be alternating current, is subject to the control circuits of the weld control 4 and is applied to the welding transformer and transmitted to the electrodes 11 of the welding yoke 12, shown in Fig. 2, through bus bar lead-in circuits 13 and 14. By means of special connections to the electrodes as at 15 and 16 and conductors 17 and 18 extending through the structure of the yoke, the voltage across the workpiece 19 is secured, hereinafter referred to as the signal voltage. This signal voltage lacks accuracy since it includes the voltage due to the inductive action of the welding tool 12 by reason of the fact that the leads 17 and 18 of the signal voltage taps must pass through the yoke 12.

In order to correct the signal voltage for this inaccuracy, only that portion of the sinusoidal signal wave is used at which the inductive action is zero, that is at the flat peak sections of the wave. Herein the wave forms will be referred to as sinusoidal whether they are true sine forms or merely approximations thereof and when the term "mid-sine" is used it refers to the position on the wave form which has no slope, whether this falls exactly in the middle of the wave form or to one side thereof. To accomplish this action a pulse wave of about one to thirty electrical degrees duration is developed from the in-phase current wave of the load circuit and this pulse used to isolate the usual flat section of the signal wave. In the formation of the pulse wave, a current transformer 9 is connected to the secondary of the welding transformer and a voltage transformation secured which duplicates the wave form of the welding current and from which the wave form is made to assume the shape of recurrent undirectional square pulses, use being made of the first clipper 20, the first amplifier 21, the second clipper 22, the second amplifier 23 and the square wave pulser 24 to secure this result. This square wave is then combined in the signal pulser 25 with the signal voltage as derived from the weld electrodes to secure a wave form having an envelope conforming to the peak values of the signal voltages.

The signal voltage is free of inductive voltages due to the tool, proximity of metal increases and other causes, but since it includes an error due to current variation in the load circuit, it is combined with the original current voltage in the voltage divider 26 to eliminate this error and this corrected signal is then amplified in the third amplifier 27 and passed on to the comparator percentage control 28 for triggering action. Under conditions of a predetermined percentage change in signal voltage, an output is secured that may be utilized to energize the operator circuit 29 which in turn may serve to operate the cut-out mechanism in the weld control circuit 11 of the power source 10. In this manner there is provided a circuit arrangement in which a control subject to voltage change of a load circuit functions independently of current inductive change in the load circuit, meeting the general requirement that the signal voltage vary directly with the resistance of the load circuit and independently of variation of current in said circuit.

In order to follow the specific circuit means by which the objects of the invention are achieved, reference is made to the specific schematic views of the drawings.

Fig. 3 is indicated as including the alternating current source 30, the welding transformer 31 and the power ignitrons 32. The weld control 4 has connection to the igniters of these ignitrons and receives power from the A. C. source 30 through transformer 33 and other means not shown. The secondary 34 of the welding transformer connects to the electrodes 11*a* and 11*b* between which the workpiece 19 is supported. The signal voltage terminals are indicated by numerals 35 and 36. The terminals of current transformer 9 connected to the secondary circuit 13—14 are indicated by numerals 37 and 38. In this figure are also indicated the weld timing circuit 29 including the relay switch R1—4 operated by the control circuit and the relay switch R2—1 operated by the weld initiating circuit. The initiating circuit is also shown diagrammatically including the relay coil R2 for closing the starting switch R2—1, a power source P, a variable resistor VR and a manual starting switch S—1.

Terminals 37 and 38 of the current transformer of Fig. 3 are identical with input terminals 37 and 38 of Fig. 4 illustrating the first clipper circuit. By means of this circuit the sine wave of the current transformation is rectified by full wave rectifier 39 and applied to inversely connected one-way rectifiers 40 and 41 in the tube 42 and to a potential dividing circuit formed of resistors 43 and 44 connected across the rectified terminals of the circuit. A smoothing capacitor 45 is connected in parallel with the resistors 43 and 44 and a keep-alive voltage supply is indicated at 46 which tends to minimize the transient voltage effects in condenser 45. A second transformer secondary 48 of transformer 47 supplies unrectified voltages to a circuit including conductor 49, resistor 50, and alternate parallel paths including on the one hand, rectifier 40 and resistor 43 and on the other hand, resistor 44 and rectifier 41. Simultaneous imposition of the voltages derived from rectifier 39 and transformer secondary 48 results, with appropriate excess value of the alternating voltage, in clipped peak sections of the alternating sine wave. These effects are diagrammatically indicated by adjoining illustrative diagrams connecting current sections in which the particular wave forms occur. The output of this circuit is indicated by numerals 51 and 52, the conductor 51 having therein a capacitor 53.

Fig. 5 discloses a standard type amplifier 21 having an output transformer 55 and a wave form at the output terminals 56 and 57 as illustrated.

In order to sharpen the wave form of Fig. 5, a second clipper action is required utilizing a circuit arrangement, as shown in Fig. 6, which is identical to that of Fig. 4 including the transformer 58, full wave rectifier 59, keep-alive source 60, potential divider units 61 and 62, inverse rectifier unit 63 and outlet capacitor 64. The output of this second clipper is amplified so that as a result of this second clipper and amplifying action, a sharp pulse form, such as indicated at 65 in Fig. 6, is obtained from the terminals 66, 67.

In the square wave pulser of Fig. 7, the output at terminals 66 and 67 of Fig. 6 is rectified with a negative polarity to produce the wave form illustrated at 68 and applied to the network 69 at the right section of this figure. This network is that of a square wave multivibrator type circuit functioning to cut off the rounded peaks of the pulse waves indicated at 68 at the left of the figure to secure the sharply square peaks of the pulse form indicated at 70 at the right of the figure. The action of the network follows the basic triggering action of the Eccles-Jordan circuit in that tube 71 is biased to conduct current normally as applied to the anodes of the tubes from source terminals 72 and 73. On a triggering impulse received from output terminals 74 and 75 of the incoming pulse waves effective on the grid of tube 71, the tube ceases to conduct while tube 76 passes current. This results in a gradual reduction of bias on the grid of tube 71 due to the charge of capacitor 77 eventually causing tube 71 again to conduct and tube 76 to cease conduction. This cycle is repeated and on appropriate values of capacitance and resistance, a square wave of the form shown at 70 is produced in the terminals 80 and 81 of this figure.

The development of signal voltage free of inductive effects is illustrated in Fig. 8. In accordance with this circuit, the sine wave signal voltage as derived from terminals 35 and 36 of Fig. 3 and the square pulse wave derived from the output terminals 80, 81 of the circuit of Fig. 7 are combined in a load circuit 25 in such a manner as to pass only the peak sections of the positive alternations of the signal wave. The sine wave form of the incoming wave signal is indicated by numeral 83. This wave is rectified by the full wave rectifier 84 to produce the wave form illustrated at 85. This wave is then passed through the load resistor 82.

Also the square wave with input terminals 80 and 81, as indicated at 86, is applied through a biasing voltage source 87 to the control grid 88 of a pentode amplifier tube 89. The current path of the pentode tube includes direct current voltage source 90 and the voltage tube 91 of the gas type effective to maintain a substantially constant voltage after breakdown irrespective of current variation within limits. A resistor 92 is connected in parallel with the voltage tube 91. A second tube 93 of the class B type, normally biased to cut off, has a grid 94 connected through the load resistor 82 to point 95 intermediate the voltage tube 91 and the cathode of tube 89. The opposite side of the voltage tube 91 at 96 is connected through a biasing voltage source 97 to the cathode 98 of tube 93. Consequently, grid 94 of tube 93 is subjected to a substantial hold-off voltage as indicated by the point 99 in the extension of load curve 100 in Fig. 12.

It now appears that on application of power to the input terminals 35, 36, 80 and 81 of the Fig. 8 network, inasmuch as the respective wave forms are in phase, there will be developed by the pulse input at 80 and 81 a current through the voltage tube 91 such as to overcome the hold-off voltage of the bias on class B tube 93, this point being indicated at 101 on the load curve of Fig. 12. To this grid voltage is added that of the peak section of the corresponding signal wave alternation producing a positive bias as indicated at point 102 in Fig. 12. This bias is effective on tube 93 to develop a series of square wave pulses at the output terminals 103 and 104 thereof and is illustrated at 105. It is apparent that the peak value of these pulses will be directly dependent upon the peak amplitude of the successive signal wave alternations 85 so that the envelope of the wave output at terminals 103 and 104 follows the envelope of the peak values of the wave alternations at 85. The output pulse form illustrated is one variation only, other variations, such as indicated by the broken lines 106, developing on equivalent variation of the signal voltage as derived from the load circuit. This may be brought about by weld fusion in a welding operation.

The power circuit of tube 93 includes in addition to the tube the power source 107, the load resistor 108 and the capacitor 109.

As previously indicated, the signal derived from the network of Fig. 8 includes the error of current variation of the circuit. In Fig. 9 is illustrated a circuit arrangement for eliminating this error. In addition to the input terminals 103 and 104 of the signal voltage, this circuit includes input terminals 110 and 111 corresponding to output terminals 110 and 111 in Fig. 4 of the drawing. It is apparent that there is applied at 110 and 111 a sine voltage wave corresponding to the initial transformation at transformer 47 in Fig. 4, following the load current variation. This voltage constitutes the element of the signal voltage which it is desirable, in proportionate value, to eliminate and this is accomplished in the network of Fig. 9 by a divisional or compensatory step in the mixer tube 112. This tube is provided with a first control grid 113 and a second control grid 114. The first control grid and the cathode 115 of the tube are connected through a rectifier unit 116 to the input terminals 110 and 111, there being also a negative bias 117 in the circuit as applied to this grid. The cathode is grounded at 118. The second control grid 114 of the mixer tube is connected to the potentiometer 119 placed across the signal circuit 103—104 so that the signal may be varied at will. Input terminal 104 is also connected to biasing battery 117 to complete the tube circuit. The incoming wave forms entering the mixer tube 112 are indicated by the adjoining wave diagram 120, wave 121 indicating the current responsive voltage and curve 122, the signal voltage. Through the action of the mixer circuit, a quotient is secured between these voltages so that only the extension in amplitude of the signal voltage beyond the current voltage is passed to outlet terminals 123 and 124 as illustrated by diagram 122a. This wave form is the final corrected signal wave of the circuit and is amplified in the third amplifier 27 of Fig. 1. The amplifier 27 is shown in Figure 9, as is also an output capacitor 123a.

In order to utilize the signal wave, it becomes necessary that utilization be made of what may be described as a comparator as illustrated in Fig. 10. Through this network the initial value of the signal voltage prior to load voltage change is fixed, so that deviations therefrom may be utilized to operate power control mechanism. Desirably, the point of power operation should be susceptible to predetermination as for example by means permitting a fixing of the operating point at a chosen percentage of the initial signal voltage. For example, if the initial signal voltage be 300 volts, it may be desirable to preset the percentage control means, bringing about operation of the power mechanism at 180 volts. The circuit of Fig. 10 includes both the means for establishing a comparison between the initial voltage and a subsequent voltage due to load change and also percentage means for establishing the percentage of change at which the mechanism will operate. Input points 123 and 124 receive the incoming signal voltages at the true value thereof and these voltages are applied to a first capacitor 125 having an extremely short time constant so as to develop the maximum signal voltage and to a second capacitor 126 having characteristics such as to permit it to follow the varying peak value of the signal voltages. The second capacitor 126 is connected directly across the incoming signal voltage, there being provided a discharge resistor 127 and a discharge switch R1—1 connected around the capacitor 126. A switch R1—2 is provided around the capacitor 125. The first capacitor 125 is connected in series with a bank of capacitors 129, each having different capacitance and connections to adjacent terminals 130 where variation in the capacitance of the circuit may be obtained through movement of the contact arm 131. The contact arm connects through a tube rectifier 132 to the negative terminal 123 of the signal circuit, the cathode of the rectifier having connection to the terminal. A switch R1—3 may be employed to deenergize the capacitor bank 129 after each operation.

The positive terminal 124 of the signal circuit is connected to the primary 134 of a low capacity transformer 135 and to the first and second capacitors 125 and 126 through a rectifier tube 136 having its negative terminal connected to the capacitors. Consequently, positive signal impulses will pass through the transformer primary, the rectifier 136 and charge capacitors 125 and 126, capacitor 126 following closely the peak value of the signal pulses and capacitor 125 maintaining a peak value because of the rectifier tube 132.

The positive terminal 124 of the incoming signal circuit is also connected to the anode 137 of vacuum tube 138 and through this tube by way of the cathode 139 and load resistor 140 to the negative terminal 123 of the circuit. A time delaying capacitor 141 is connected in parallel with the load resistor 140 as shown. The grid 142 of tube 138 is connected to the cathode of the tube through the secondary 143 of transformer 135 and the biasing battery 144 whereby the tube is normally biased below cut off. The secondary 143 of the transformer is bypassed by capacitor 145 and resistor 146 in order to introduce time delay factors in the tube circuit as will be described hereinafter. The load of tube 138 and its associated circuit is small so as not to introduce material modification of the signal voltage.

There is provided in the network of Fig. 10 a mixer tube 150 provided with a cathode 151, an anode 152, first control grid 153 and second control grid 154. The purpose of this tube is to combine the voltage effects due to the first capacitor 125 and the varying peak voltages of the incoming signal so that on development of a predetermined voltage relationship between these two grids, the tube is conditioned to pass power in an operator circuit, such as indicated in Fig. 11. For example, in the particular type of tube employed, the power conditioning status develops when the bias on the second control grid 154 drops below the voltage applied to cathode 151. The first control grid 153 is connected to a point 155 on the negative side of the first capacitor 125 between this capacitor and the capacitor bank 129 so that this point registers a percentage of the signal voltage between terminals 123 and 124 as determined by the contact engagement of the movable arm 131 of the capacitor bank. The error introduced by the rectifier 132, which is less than 1% of the signal voltage, may be compensated in the capacitor bank. In this manner any desired percentage value of the initial maximum signal voltage may be preselected.

The second control grid 154 of the mixer tube 150 is connected through the biasing battery 156 to the load circuit of tube 138 between the cathode of the tube and the load resistor 140. Also, the cathode 151 of the mixer tube is connected to the negative side of the load resistor 140 and to the screen grid as shown. Output terminals 157 and 158 connect respectively to the cathode 151 and the anode 152 of the mixer tube.

The operation of this network is as follows: The movable arm 131 of the capacitor bank 129 is adjusted to secure for the first capacitor 125, the desired percentage drop in relation to the total initial and maximum voltages of the load circuit prior to development of voltage change in the load circuit. The signal voltage is impressed on the circuit and the positive impulse passes through rectifier 136 and charges both capacitors 125 and 126 to the peak value. At the same time the secondary of transformer 135 is energized to overcome the bias of battery 144 at the grid 142 of tube 138 thereby permitting a load current to pass through resistor 140 and impressing a triggering voltage on the second control grid 154. Due to the fact, however, that the voltage of the second capacitor 126 and connected cathode 151 is maintained above that of the first control grid 153, no power is passed through this tube 150. On a drop of the signal voltage, such as is suggested in the broken line envelopes 106 of Fig. 8, the voltage on the second capacitor 126 drops and if the drop is such as to bring it to or below the voltage value of the first capacitor 125, the tube 150 strikes and power is transmitted to the operator circuit.

In order to secure uniformity in the action of the mixer tube arising from the fact that the voltage of capacitor 126 is variable with the recurrent signal impulses due to the time constant of the capacitor, the circuit of tube 138 is provided with the time delay elements including capacitors 141 and 145 for delaying the trigger action of this circuit until the peak point of charge of capacitor 126 for each signal pulse. By this means the operator circuit is energized whenever the signal voltage drops to the preselected value of the percentage capacitor 125.

Any desired operator circuit may be employed which may be effective either to modify the supply of power to the initiating load circuit of the system or to energize mechanism in entirely independent circuits. Following the application to welding, the operator circuit, which may include the amplifier tube 160 connected to the relay coil R1, may function to energize relay switch R1—4 in the timing control circuit of Fig. 3 to open the same and thereby cut off the supply of power to the welder. In this manner the time of power at the weld is automatically terminated as a result of change of resistance at the weld due to fusion, thus supplying a true monitor of weld quality.

It should be pointed out that the system of control, as above described, is markedly free of impedances arising from use of resistance potentiometer capacitor combinations, rectifiers, filters and transformers all of which develop time lag between the initial signal voltage change at the load and the final cut-out mechanism. In high speed resistance welding, for example, where weld time is frequently as low as 10 cycles of a 60-cycle supply of current, time lag which may extend as high as 5 cycles becomes of outstanding importance and must either be radically reduced as in the present circuit or compensating means introduced to permit the apparatus to operate successfully. It is pointed out further that the specific circuit means as described secures a precise and accurate elimination of the effect of current variation in the load circuit including that arising from the inductive action of the welding tool itself so that the signal as obtained possesses a correct voltage value variable directly and only with the change of resistance in the load circuit. Also, since no dependence is placed on high amplification, stability of operation is secured; and through use of stabilized electronic amplifiers high input signal power becomes of lesser importance. An additional advantage of the circuit arises from the close control of current effects in that wider current fluctuations become permissible.

While specific circuit arrangements have been shown and described, equivalent modifications may readily be substituted in accordance with the knowledge of those skilled in the art and hence limitations to the particular showing are not intended other than may be required by the scope of the claims hereto appended.

What is claimed is:

1. In an electric control system, a load subject to voltage and current change, means for translating voltage variable with said load voltage, means for neutralizing load current change effects on said voltage translator to obtain a corrected load voltage value variable only with load resistance, a voltage comparator connected to said load for comparing the corrected values of the maximum initial load voltage prior to change to a subsequent load voltage after load change, means for selecting a percentage of said corrected initial voltage for each load, a circuit control mechanism operator, and means for energizing said operator on change of the corrected initial load voltage to the selected percentage value, said voltage translating means comprising a full wave rectifier, and pulse means for limiting said rectified wave to the peak sector thereof.

2. In an electric control system, a load subject to voltage and current change, means for translating voltage variable with said load voltage, means for neutralizing load current change effects on said voltage translator to obtain a corrected load voltage value variable only with load resistance, a voltage comparator connected to said load for comparing the corrected values of the maximum initial load voltage prior to change to a subsequent load voltage after load change, means for selecting a percentage of said corrected initial voltage for each load, a circuit control mechanism operator, and means for energizing said operator on change of the corrected initial load voltage to the selected percentage value, said comparator comprising a first capacitor connected to said voltage translator and adapted to receive selected current neutralized pulses therefrom of a magnitude varying with said load voltage, means for holding said capacitor at a selected percentage of the initial load voltage existing prior to load voltage change, a second capacitor, means for maintaining said second capacitor at voltage values varying with the load voltage, a vacuum tube having a cathode, anode and first and second control grids, said first capacitor having connection to said first control grid, and said second capacitor having connection to the cathode, and trigger means connected to said second grid for energizing said tube on development of a predetermined ratio between said cathode and first grid voltages.

3. In an electric control system, a load subject to voltage and current change, means for translating voltage variable with said load voltage, means for neutralizing load current change effects on said voltage translator to obtain a corrected load voltage value variable only with load resistance, a voltage comparator connected to said load for comparing the corrected values of the maximum initial load voltage prior to change to a subsequent load voltage after load change, means for selecting a percentage of said corrected initial voltage for each load, a circuit control mechanism operator, and means for energizing said operator on change of the corrected initial load voltage to the selected percentage value, said comparator comprising a first capacitor connected to said voltage translator and adapted to receive selected current neutralized pulses therefrom of a magnitude varying with said load voltage, means for holding said capacitor at a selected percentage of the initial load voltage existing prior to load voltage change, a second capacitor, means for maintaining said second capacitor at voltage values varying with the load voltage, a vacuum tube having a cathode, anode and first and second control grids, said first capacitor having connection to said first control grid, and said second capacitor having connection to the cathode, and trigger means connected to said second grid for energizing said tube on development of a predetermined ratio between said cathode and first grid voltages, said trigger means including a thermionic tube and time delay means for delaying trigger action to the point of maximum voltage development in said second capacitor.

4. In an electric control system, a load subject to voltage and current change, means for translating voltage variable with said load voltage, means for neutralizing load current change effects on said voltage translator to obtain a corrected load voltage value variable only with load resistance, a voltage comparator connected to said load for comparing the corrected values of the maximum initial load voltage prior to change to a subsequent load voltage after load change, means for selecting a percentage of said corrected initial voltage for each load, a circuit control mechanism operator, and means for energizing said operator on change of the corrected initial load voltage to the selected percentage value, said percentage-selecting means comprising a first capacitor, a bank of capacitors connected to said first capacitor in parallel series to form a reference capacitance, manual means for selecting any one of said bank of capacitors to change the capacity value of said reference capacitor at will, a rectifier in series with said first capacitor and bank of capacitors, said capacitors and rectifier being connected across said load voltage translating means and to said comparator to energize said comparator on change of load voltage indication to a predetermined ratio of said selected percentage voltage.

5. In an electric control system, a load subject to voltage and current change, means for translating voltage variable with said load voltage, means for neutralizing load current change effects on said voltage translator to obtain a corrected load voltage value variable only with load resistance, a voltage comparator connected to said load for comparing the corrected values of the maximum initial load voltage prior to change to a subsequent load voltage after load change, means for selecting a percentage of said corrected initial voltage for each load, a circuit control mechanism operator, and means for energizing said operator on change of the corrected initial load voltage to the selected percentage value, said comparator comprising a first capacitor connected to said voltage translator and adapted to receive selected current neutralized pulses therefrom of a magnitude varying with said load voltage, means for holding said capacitor at a selected percentage of the initial load voltage existing prior to load voltage change, a second capacitor, means for maintaining said second capacitor at voltage values varying with the load voltage, a vacuum tube having a cathode, anode and first and second control grids, said first capacitor having connection to said first control grid, and said second capacitor having connection to the cathode, and trigger means connected to said second grid for energizing said tube on development of a predetermined ratio between said cathode and first grid voltages, said trigger means including a thermionic tube and time delay means for delaying trigger action to the point of maximum voltage development in said second capacitor, and said percentage-selecting means comprising a bank of capacitors connected to said first capacitor in parallel series to form a reference capacitance, manual means for selecting any one of said bank of capacitors to change the capacity value of said reference capacitor at will, a rectifier in series with said first capacitor and bank of capacitors, said capacitors and rectifier being connected across said load voltage translating means and to said comparator to energize said comparator on change of load voltage indication to a predetermined ratio of said selected percentage voltage.

6. In an electric system, a load circuit subject to voltage change, means connected to the load circuit for translating the sinusoidal load voltage wave to a series of recurrent rectified voltage pulses corrected for load current change, a first capacitor connected to said translating means, means for maintaining said capacitor at maximum input voltage, a second capacitor connected to said translating means and variable in voltage therewith, a thermionic tube connected to said translating means having a cathode, anode and first and second control grids, said first capacitor having connection to said first control grid and said second capacitor having connection to said cathode, trigger means connected to said translating means and to said second control grid, and means for energizing said trigger means at each recurrent pulse whereby on change of second capacitor voltage to a predetermined ratio of the first capacitor voltage said tube is energized to transmit power.

7. In an electric system, a load circuit subject to voltage change, means connected to the load circuit for translating the sinusoidal load voltage wave to a series of recurrent rectified voltage pulses corrected for load current change, a first capacitor with fixed capacitance, a variable capacitor, a one-way rectifier, said first capacitor, variable capacitor and rectifier being connected in series across said translating means to form a reference capacitance whereby, on variation of capacity of the variable capacitor, the voltage of the reference capacitance may be fixed at a selected percentage of the maximum input voltage, a second capacitor connected to said translating means and variable in voltage therewith, a thermionic tube connected to said translating means having a cathode, anode and first and second control grids, said reference capacitance having connection to said first control grid and said second capacitor having connection to said cathode, trigger means connected to said translating means and to said second control grid, and means for energizing said trigger means at each recurrent pulse whereby on change of second capacitor voltage to a predetermined ratio of the first capacitor voltage said tube is energized to transmit power.

8. In an electric system, a load circuit receiving alternating current subject to average voltage and current change, means for translating voltages from said circuit variable with said load voltage, and means for neutralizing load current change effects on said voltage translator, said translating means comprising a current transformer, pulse forming means connected to the output terminals of said transformer for forming pulses symmetrically positioned at the peak points of the transformer output wave, and means for superimposing said pulses on the peak sections of the signal voltage wave derived from said load circuit to form a signal pulse wave envelope.

9. In an electric system, a load circuit receiving alternating current subject to average voltage and current change, means for translating voltages from said circuit variable with said load voltage, and means for neutralizing load current change effects on said voltage translator, said translating means comprising a current transformer, pulse forming means connected to the output terminals of said transformer for forming pulses symmetrically positioned at the peak points of the transformer output wave, and means for superimposing said pulses on the peak sections of the signal voltage wave derived from said load circuit to form a signal pulse wave envelope, said current neutralizing means comprising a mixing thermionic tube having two control grids, an anode and cathode, connections from one grid to said signal pulse wave envelope forming means, connection from another grid to said load current transformer, and circuit means for subtracting the voltage of the load current from the signal voltage.

10. In electric resistance welders having an alternating power source, a welding transformer having work-engaging electrodes in the secondary circuit of the transformer, a control system for changing power flow from the source on weld fusion, comprising a voltage signal translating means connected to said electrodes sensitive to voltage change at weld fusion, means for forming said signal voltage into an envelope of mid-wave pulses variable in amplitude with load voltage, means for extracting current induced voltage from said signal voltage, means for comparing the preweld signal voltage to the postweld signal voltage, mechanism for changing power flow to the weld, and means operative on a predetermined change of signal voltage from the preweld value for actuating said mechanism.

11. In electric resistance welders having an alternating power source, a welding transformer having work-engaging electrodes in the secondary circuit of the transformer, a control system for changing power flow from the source on weld fusion, comprising a voltage signal translating means connected to said electrodes sensitive to voltage change at weld fusion, means including a signal pulser circuit responsive conjointly to mid-wave secondary voltage and signal voltage across the electrodes for forming said signal voltage into an envelope of mid-wave pulses variable in amplitude with load voltage, means for extracting current induced voltage from said signal voltage, means for comparing the preweld signal voltage to the postweld signal voltage, mechanism for changing power flow to the weld, means operative on a change of signal voltage from the preweld value for actuating said mechanism, and means for selecting at will a percentage of the initial signal voltage for the point of actuation of the power mechanism.

12. In an electric system, a load circuit receiving alternating current subject to average voltage and current change, means for translating voltages from said circuit variable with said load voltage, and means for neutralizing load current change effects on said voltage translator, said translating means comprising a current transformer, pulse forming means connected to the output terminals of said transformer for forming pulses symmetrically positioned at the peak or mid-wave points of the transformer output wave, and means for superimposing said pulses on the peak sections of the signal voltage wave derived from said load circuit to form a signal pulse wave envelope, said last-named means comprising a class B thermionic tube normally biased through a resistor below cut-off, a voltage gas tube in parallel with said resistor, power outlet terminals connected to said class B tube, a grid including trigger tube in series with said voltage tube, said trigger tube normally being biased to cut-off, connections between the grid of said trigger tube and said pulse forming means, a resistor forming a common path of the signal wave and said class B grid bias circuit, whereby said class B tube passes current at the peak point only of the signal wave on elimination of the hold-off bias by incoming pulses from the pulse forming means to form an envelope conforming to load voltage change.

13. In a system of weld control by voltage change at the electrodes at weld fusion, a circuit for obtaining a voltage signal free of load circuit inductive voltages, which comprises electrical connections to the welder electrodes to obtain an alternating current signal voltage wave of sine form, electrical connections to the welder load circuit to obtain a second sine voltage wave, means for obtaining cyclic pulses at the peak sectors of said second sine wave, means for combining said signal sine wave and said pulses to secure peak signal wave pulses, said combining means comprising a thermionic tube having a cathode, anode and control grid normally biased to cut-off and trigger circuit connections from the grid to the pulse forming means, means for overcoming said grid bias and energizing said tube on pulse application to said grid.

14. In a system of weld control by voltage change at the electrodes at weld fusion, comprising in combination with the electrodes, an alternating welding current secondary connected to the electrodes and a signal circuit connected across the electrodes and the workpiece therebetween, means associated with said secondary and said signal circuit and responsive to peak current wave values for providing an envelope of signal voltage pulses corrected for induced voltages and line current variations, means for setting up a proportional pre-weld voltage pulse reference, means for comparing post-weld voltage pulses with the pre-weld voltage pulse reference, and means responsive to said comparison for modifying the supply of current to said electrodes.

15. In a system of weld control by voltage change at the electrodes at weld fusion, comprising in combination with the electrodes, an alternating welding current secondary connected to the electrodes and a signal circuit connected across the electrodes and the workpiece therebetween, means associated with said secondary and said signal circuit and responsive to peak current wave values for providing an envelope of signal voltage pulses corrected for induced voltages and line current variations, means for setting up a proportional pre-weld voltage pulse reference, means for comparing post-weld voltage pulses with the pre-weld voltage pulse reference, and means responsive to said comparison for modifying the supply of current to said electrodes, said reference and comparison means including comparison capacitances and a common comparator device conjointly responsive to pre-weld and post-weld charges of said capacitances.

16. The method of controlling alternating current resistance welding through weld voltage change at fusion, which comprises, securing a continuous current signal through the weld, correcting the signal to respond primarily to peak mid-wave values whereby to eliminate induced voltage values in the electrode supply circuit, establishing a continuing proportional pre-fusion charge of corrected signal voltage pulses, continuously comparing the proportional charge to the existing voltage, and providing a control impulse when the existing voltage and the pre-fusion charge reach a predetermined relationship.

17. The method of controlling alternating current resistance welding through voltage change at fusion, which comprises, securing a continuous current signal through the weld, securing a continuous manifestation of voltage due to current in the electrode secondary circuit, clipping the peaks of the voltage sine waves of the secondary voltage to eliminate induced voltage effects due to voltage change, forming amplified square wave pulses of these clipped secondary sine waves, forming an envelope of pulses by the conjoint effect of signal voltage pulses and squared secondary pulses, extracting the current induced voltage from the signal voltage, comparing a forwarded record of pre-weld signal voltage with momentarily existing post-weld voltage, and providing a controlling impulse when post-weld and pre-weld voltages reach a predetermined relationship.

18. In a system of weld control by voltage change at the electrodes at weld fusion, comprising in combination with the electrodes, an alternating welding current secondary circuit connected to the electrodes and a signal circuit connected across the electrodes and the workpiece therebetween, means associated with said secondary and said signal circuit and responsive to peak current wave values for providing an envelope of signal voltage pulses corrected for induced voltages and line current variations, means including a capacitor and proportioning means for setting up a proportional pre-weld voltage peak pulse reference, means including an impedance and associated comparator means for comparing post-weld voltage peak pulses with the pre-weld voltage peak reference, and means responsive to said comparison for modifying the supply of current to said electrodes.

EDWIN M. CALLENDER.
HERBERT D. VAN SCIVER II.

REFERENCES CITED

The following references are of record in the file of this patent:

UNITED STATES PATENTS

| Number | Name | Date |
|---|---|---|
| 1,959,690 | Roth | May 22, 1934 |
| 2,433,827 | Callender | Jan. 6, 1948 |